Feb. 4, 1958 J. H. FRANCIS 2,821,774
MACHINE FOR INSERTING PINS INTO A PERFORATED RIBBON
Filed Nov. 22, 1955 3 Sheets-Sheet 1

INVENTOR.
JOHN H. FRANCIS
BY *Roberts, Cushman & Grover*
ATTY'S.

Feb. 4, 1958 J. H. FRANCIS 2,821,774
MACHINE FOR INSERTING PINS INTO A PERFORATED RIBBON
Filed Nov. 22, 1955 3 Sheets-Sheet 2

INVENTOR.
JOHN H. FRANCIS
BY *Roberts, Cushman & Grover*
ATTY'S.

Feb. 4, 1958  J. H. FRANCIS  2,821,774
MACHINE FOR INSERTING PINS INTO A PERFORATED RIBBON
Filed Nov. 22, 1955  3 Sheets-Sheet 3
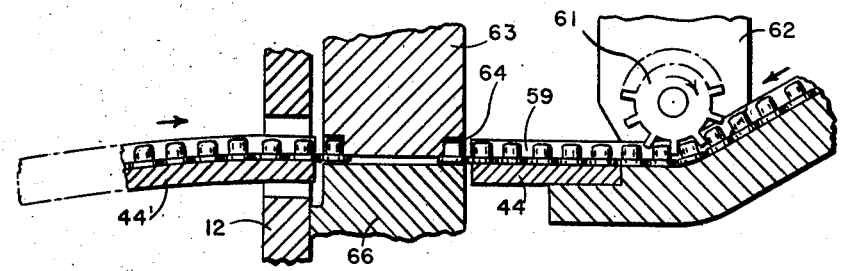
FIG. 10
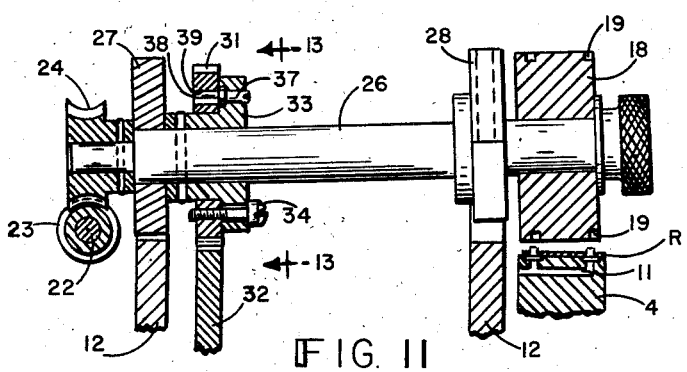
FIG. 11
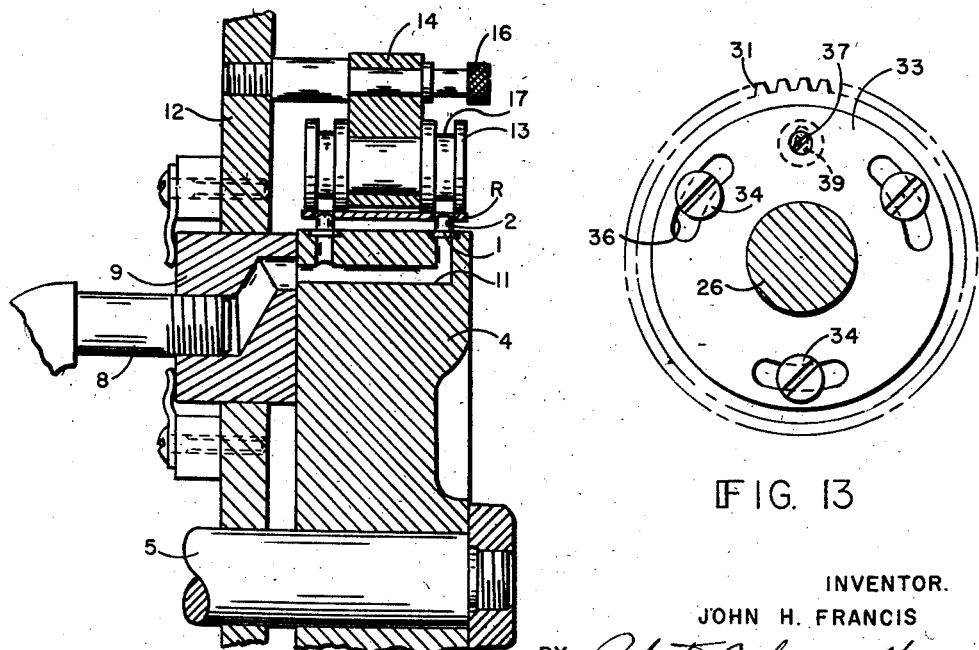
FIG. 12
FIG. 13
INVENTOR.
JOHN H. FRANCIS
BY Roberts, Cushman + Grover
ATTY'S.

United States Patent Office 2,821,774
Patented Feb. 4, 1958

2,821,774

MACHINE FOR INSERTING PINS INTO A PERFORATED RIBBON

John H. Francis, Hounslow, England, assignor to Technicolor Corporation, Hollywood, Calif., a corporation of Maine Application November 22, 1955, Serial No. 548,515

7 Claims. (Cl. 29—211)

This invention relates to a machine for inserting headed pins into a perforated ribbon and more particularly to a machine for mounting register pins in a pin-belt of the type used for registering cinematographic film. Ordinarily these pins have shanks which are shaped to fit the sprocket holes of film with flat heads which seat against the back side of the belt, each shank having an elongate cross-section with the short dimension extending lengthwise of the belt and the long dimension extending crosswise of the belt. The belt is perforated along each edge with perforations substantially the same shape and size as those of the pin shanks and pins are mounted in both rows of perforations. While the aforesaid short dimension may be the same in both rows of pins, the long dimension of the shanks of one row of pins is preferably less than that of the other row so as not to fill the film perforations transversely of the film.

Heretofore it has been proposed to feed the perforated ribbon past a pinning station intermittently and insert a single pin at each step, but this procedure has been slow and expensive. Objects of the present invention are to increase the rate of inserting the pins, to feed the ribbon continuously instead of intermittently, and to insert the pins in both rows concomitantly.

According to the present invention the machine comprises a carrier having a longitudinal row of seats for supporting the pins with their heads bearing on the seats and their shanks projecting therefrom, the spacing of the seats approximately that of the openings in the belt or other ribbon into which the pins are to be inserted, together with means for detachably holding the pins on their seats, means for feeding the ribbon to the carrier obliquely so that the shanks enter the openings and means for pressing the ribbon toward the carrier to seat the ribbon against the heads. The means for holding the pins on the seats preferably comprises a vacuum manifold in the carrier with ducts leading to the seats. The carrier is preferably in the form of a rotor having the aforesaid seats distributed in one or more circumferential rows about its periphery, in which case the ribbon is fed to the rotor tangentially. The means for feeding pins to the aforesaid rotor preferably comprises a second rotor, the two rotors having parallel axes and tangential peripheries and equal peripheral speeds in the same direction at the point of tangency, the periphery of the second rotor having one or more circumferential rows of recesses spaced substantially the same as the aforesaid seats and shaped to receive the shanks of pins with the pin heads directed radially so as to be presented to the seats at the aforesaid point. Preferably the recesses of the second rotor also open to the side of the rotor and the pins are fed into the recesses from the side.

In a more specific aspect the shanks of the pins have an elongate cross-section like the perforations of a cinematographic film and the short dimensions are disposed lengthwise of the ribbon, in which case the width of the aforesaid recesses in the second rotor circumferentially of the rotor approximate the smaller cross-sectional dimension of the shanks so that the shanks can be inserted in the recesses only with their long cross-sectional dimension extending axially of the rotor. The pins are preferably fed to the second rotor in a row through a guideway by means of a torque motor or other means for yieldingly urging the row toward the side of the rotor so that the foremost pin enters a recess as the recess passes the guideway. The pins should be fed through the guideway with their shanks projecting in the same direction, in which case the feed means may comprise a sprocket wheel meshing with the shanks for advancing the row of pins along the guideway. Before the pins reach the pin-inserting means they should be oriented so that their short cross-sectional dimensions will be disposed lengthwise of the ribbon when presented to the ribbon, and this is preferably accomplished by rollers on opposite sides of the path of the shanks as the pins pass along the aforesaid guideway, the rollers being spaced apart a distance greater than the aforesaid short cross-sectional dimension but less than the long cross-sectional dimension so that the pins may pass only when their long dimensions extend lengthwise of the guideway, together with means to turn the rollers, thereby to rotate the pins into alignment with the space between the rollers by frictional contact with the shanks.

For the purpose of illustration a typical embodiment of the invention is shown in the accompanying drawings in which Fig. 1 is a plan view of a typical pin for use in registering cinematographic films;

Fig. 10 is a section on line 10—10 of Fig. 5;

Fig. 11 is a section on line 11—11 of Fig. 5;

Fig. 12 is a section on line 12—12 of Fig. 5; and

Fig. 13 is a section on line 13—13 of Fig. 11.

Figure 2:
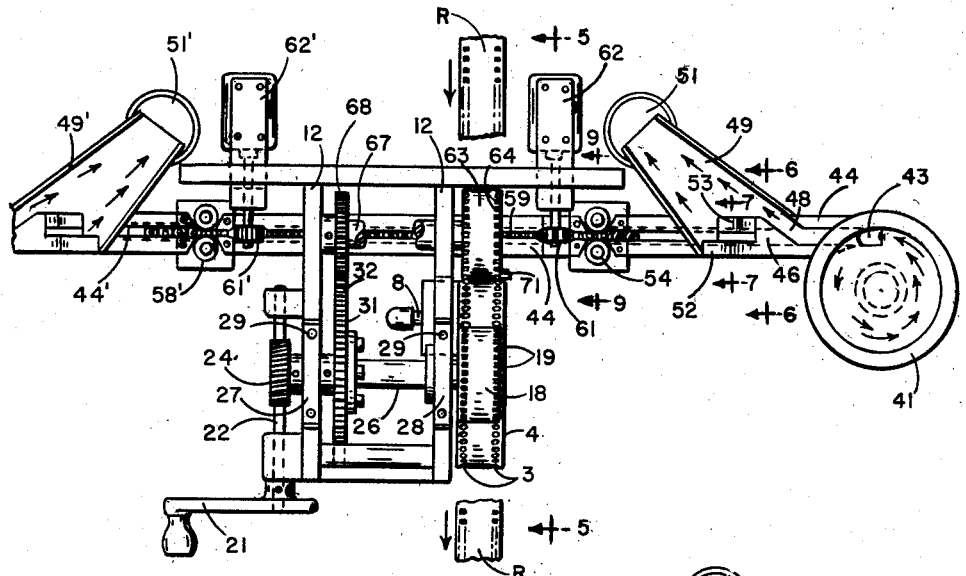
Fig. 2 is a plan view of the machine.
Figure 1:
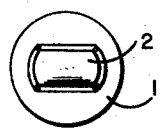
Figure 3:
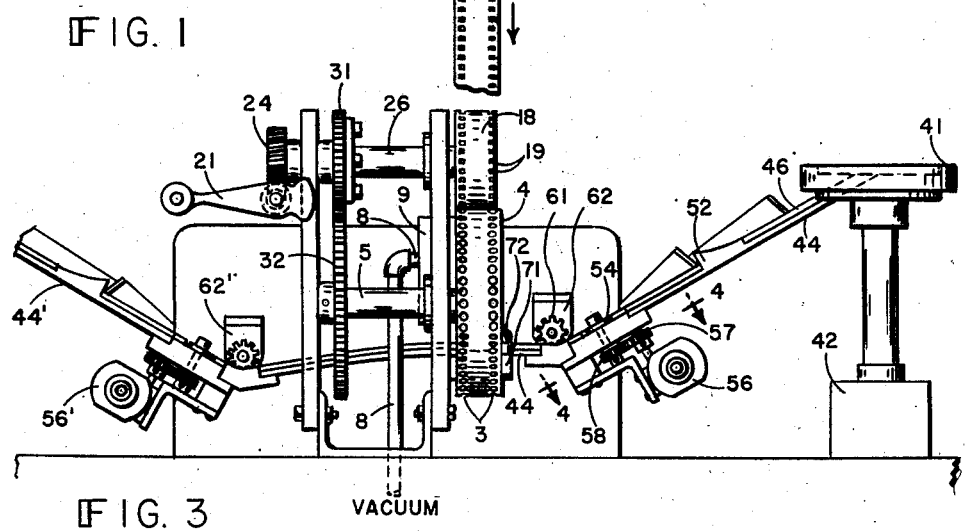
Fig. 3 is a front elevation of the machine.
Figure 5:
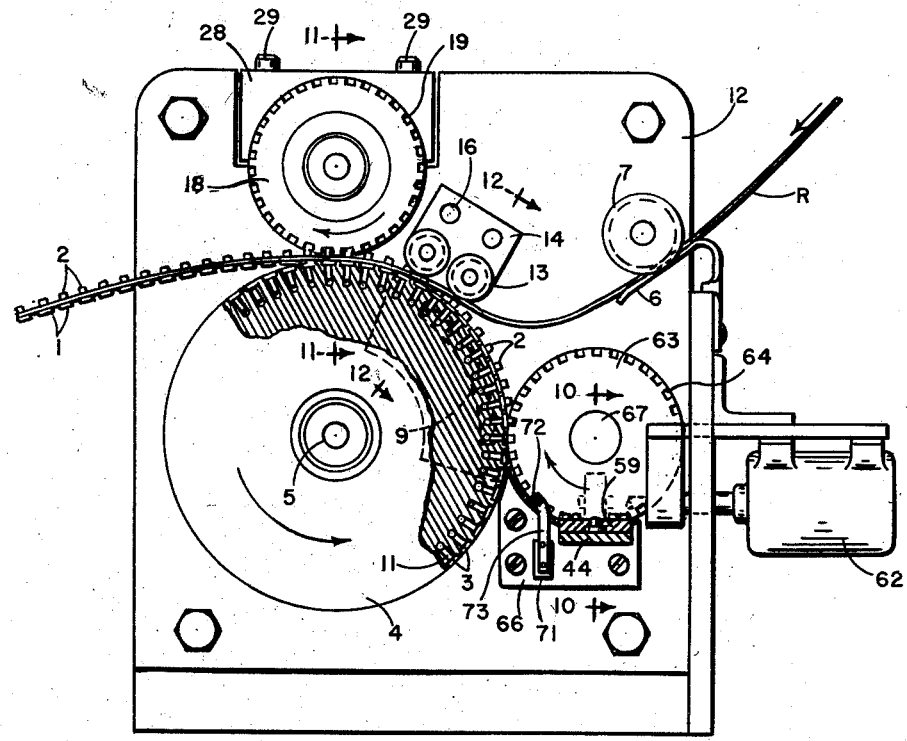
Fig. 5 is a section on line 5—5 of Fig. 2.

In the illustration the pins have flat circular bases 1 and shanks 2 for insertion through a ribbon R with the heads of the pins seating against one side of the ribbon as shown in Fig. 5. As shown in Figs. 1 and 2 the shanks have an elongate cross-section with the short dimension extending lengthwise of the ribbon and the long dimension extending crosswise of the ribbon. For use in registering cinematographic film the long dimensions of the shanks correspond to the long dimensions of the film perforations along one edge of the ribbon and along the other edge of the ribbon the long dimension of the shanks is somewhat less so that they do not fill the film perforations crosswise of the film. In Figs. 2 and 3 the full-fitting pins are applied to the ribbon R along its left-hand margin and the smaller pins are applied to the ribbon along the right-hand margin.

According to the present invention the pins are placed in recessed seats 3 distributed in two circumferential rows around the periphery of a rotor 4 on shaft 5 with their heads fitting loosely in the seats and their shanks projecting radially from the rotor (Figs. 2, 3 and 5). As shown in Fig. 5 the rotor turns in a counterclockwise direction, the pins are presented to it at the right-hand side and they are inserted into the ribbon at the top, the ribbon being fed tangentially to the rotor between a support 6 and a guide roller 7. While being carried by the rotor the pins are held in their seats by vacuum means communicating with the seats through a pipe 8, manifold 9 and ducts 11, the manifold 9 being disposed in the stationary frame 12 and extending from the point where the pins are applied to the rotor to the point where they are inserted in the belt (Figs. 5 and 12). As the ribbon approaches the rotor tangentially the pins gradually enter the perforations in the ribbon which is backed by rollers 13 journaled in the support 14 which is mounted on the frame 12 by means of screws 16, the rollers having grooves 17 to accommodate the tips of the pin shanks as they are inserted through the ribbon.

After the ribbon has been applied to the pin shanks it is pressed against the pin heads by means of a roller 18 above the rotor, the roller having recesses 19 in its edges to accommodate the projecting tips of the pins. The roller 18 is driven by means of a crank 21 through a shaft 22, worm 23, worm wheel 24, and shaft 26 (Figs. 2, 3 and 11). To facilitate threading the ribbon between the rotor 4 and roller 18 the shaft 26 is journaled in blocks 27 and 28 which are mounted in recesses in the frame 12 by means of screws 29. By loosening the screws the shaft 26 may be tipped to the position shown in Fig. 11 where the ribbon may be inserted edgewise between the rotor and roller. The rotor shaft 5 is driven from the roller shaft 26 through gears 31 and 32. The gear 31 is attached to the shaft 26 through a collar 33, the gear 31 being secured to the collar by means of pins 34 extending through slots 36 in the collar and threading into the gear 31 (Figs. 11 and 13). To bring the roller 18 in synchronism with the rotor 4, so that the projecting pin shanks will register with the recesses 19, the gear 31 is adjustable circumferentially of the collar 33 by means of a pin 37 rotatably mounted in the collar and having an eccentric portion 38 extending into a radial slot 39 in the gear. By loosening the screws 34 and rotating the pin 37 the roller 18 may be brought into exact synchronism with the rotor 4, after which the screws 34 are tightened to hold the parts in synchronism. In lifting the shaft 26 for threading purposes, as illustrated in Fig. 11 and as above described, the gear 31 may be left in mesh with the gear 32 so that the parts need not be thrown out of synchronism in threading the machine.

Figure 6:
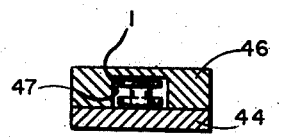
Fig. 6 is a section on line 6—6 of Fig. 2.
Figure 7:
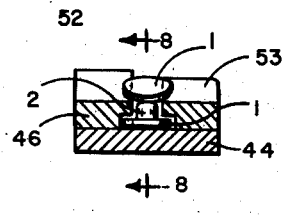
Fig. 7 is a section on line 7—7 of Fig. 2.
Figure 8:
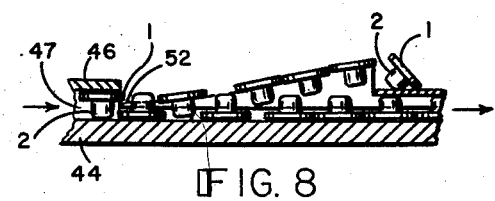
Fig. 8 is a section on line 8—8 of Fig. 7.

In the illustration the aforesaid smaller pins are fed to the rotor 4 from a hopper 41 on the right (Figs. 2 and 3) and the full-fitting pins are fed to the rotor from a similar hopper on the left. The hopper 41 is vibrated by well known means located in the base 42 to cause the pins in the hopper to travel in the spiral path indicated in Fig. 2 to the outlet 43 where they drop into an inclined chute 44. As they enter this chute they may be in any one of several positions. A short distance below the hopper the chute 44 is provided with a cover 46 forming a tunnel 47 (Fig. 6) through which the pins may pass in only two positions, head up or head down. Thus the pins sliding on their sides are diverted through an outlet 48 to a chute 49 leading to a receptacle 51. After the pins pass through the aforesaid tunnel they pass ramps 52 and 53 on opposite sides of the guideway which are upside down from those which are right side up, those resting on their heads continuing along the guideway and those which are upside down riding up the ramps as illustrated in Figs. 7 and 8 and then dropping into the chute 49 leading to the receptacle 51 (Fig. 2).

Figure 4:
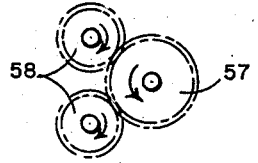
Fig. 4 is a section on line 4—4 of Fig. 3.
Figure 9:
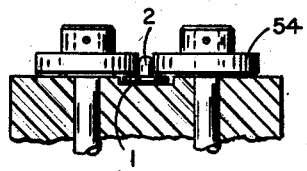
Fig. 9 is a section on line 9—9 of Fig. 2.

After all the pins have been discarded except those resting on their heads they reach a pair of rollers 54 driven by a motor 56 through a gear 57 and two gears 58 connected to the rollers respectively (Figs. 2, 3, 4 and 9). As shown in Fig. 9 the spacing between the two rollers 54 is less than the long cross-sectional dimension of the pin shanks so that the pins can pass the roller only when their long cross-sectional dimensions are directed lengthwise of the guideway. As shown in Fig. 4 the rollers 58 are rotated in the same direction to turn the pins into alignment with the space therebetween by frictional engagement therewith. Beyond the rollers 54 the guideway is provided with flanges 59 which overhang the heads of the pins and are spaced apart only slightly more than the short cross-sectional dimension of the pin shanks so that the pins are maintained in the same orientation as they proceed along the guideway.

Beyond the rollers 54 is a pin feeder comprising a sprocket wheel 61 driven by a motor 62, the teeth on the sprocket wheel being spaced to mesh between the pin shanks when the pin heads abut each other as shown in Fig. 10. The motor 62 should be of the torque type or other type which yieldingly urges the row of pins along the guideway 44.

As shown in Figs. 2, 3, 5 and 10, the end of the guideway 44 is presented to the side of a feed wheel 63 having in its periphery recesses 64 which open both radially and axially. As shown in Fig. 10 the guideway is so positioned relative to the feed wheel that the shanks of the pins enter the recesses 64 with the pin heads overlapping the periphery of the wheel. With the motor 62 yieldingly pressing the row of pins toward the feed wheel 63, the foremost pin enters the next recess in the wheel as the recess passes the guideway. To hold the pins in the recesses 64 while they travel from the point of entry to the point where they are picked off by the air suction in rotor 4, a shoe 66 is mounted on the frame 12 under the feed wheel as shown in Figs. 5 and 10. The feed wheel 63 is mounted on a shaft 67 which is driven by gear 68 meshing with the aforesaid gear 32.

If a full-fitting pin is fed to the rotor from the right-hand side it would damage the ribbon because the ribbon is perforated to fit full-fitting pins on the left and the smaller pins on the right. Therefore, a switch 71 is mounted on shoe 66 to operate a signal when a full-fitting pin passes on the smaller pin side (Figs. 2, 3 and 5), the switch being actuated by a roller 72 on the end of arm 73. The roller 72 is disposed adjacent the side of feed wheel 63 opposite the path of the pin shanks. The shanks of the smaller pins are disposed wholly within the recesses 64 and do not affect the switch but when a full-fitting pin passes it operates the switch to make a signal.

While the smaller pins are being fed to the feed wheel 63 as above described, the full-fitting pins are being fed to the feed wheel from the left by similar mechanism similarly designated.

It should be understood that the present disclosure is for the purpose of illustration only and that this invention includes all modifications and equivalents which fall within the scope of the appended claims.

1. For inserting into a ribbon having a row of openings pins having shanks projecting through the openings with heads seating on one side of the ribbon around the openings, a machine comprising a support, journaled on the support a rotor having on its periphery a circumferential row of seats for supporting said pins with their heads bearing on the seats and their shanks projecting radially, the circumferential spacing of the seats approximating that of the openings in the ribbon, journaled on said support a second rotor for feeding pins to said seats, the two rotors having parallel axes and tangential peripheries and equal peripheral speeds in the same direction at the point of tangency, the periphery of the second rotor having a circumferential row of recesses spaced substantially the same as the seats and shaped to receive the shanks of pins with the pin heads directed radially so as to be presented to said seats at said point, means for detachably holding the pins on said seats, means for feeding the ribbon to the first rotor tangentially so that said shanks enter said openings, and means for pressing the ribbon toward the first rotor to seat the ribbon against said heads.

2. For inserting into a ribbon having a row of openings pins having shanks projecting through the openings with heads seating on one side of the ribbon around the openings, a machine comprising a support, journaled on the support a rotor having on its periphery a circumferential row of seats for supporting said pins with their heads bearing on the seats and their shanks projecting radially, the circumferential spacing of the seats approximating that of the openings in the ribbon, journaled on said support a second rotor for feeding pins to said seats, the two rotors having parallel axes and tangential peripheries and equal peripheral speeds in the same direction at the point of tangency, the periphery of the second rotor having a circumferential row of recesses spaced substantially the same as the seats and shaped to receive the shanks of pins with the pin heads directed radially so as to be presented to said seats at said point, said recesses also opening to one side of the second rotor, means for feeding pins to said recesses from said side, means for detachably holding the pins on said seats, means for feeding the ribbon to the first rotor tangentially so that said shanks enter said openings, and means for pressing the ribbon toward the first rotor to seat the ribbon against said heads.

3. For inserting into a ribbon having a row of openings pins having shanks projecting through the openings with heads seating on one side of the ribbon around the openings, each of said shanks having an elongate cross-section with the short dimension extending lengthwise of the ribbon, a machine comprising a support, journaled on the support a rotor having on its periphery a circumferential row of seats for supporting said pins with their heads bearing on the seats and their shanks projecting radially, the circumferential spacing of the seats approximating that of the openings in the ribbon, journaled on said support a second rotor for feeding pins to said seats, the two rotors having parallel axes and tangential peripheries and equal peripheral speeds in the same direction at the point of tangency, the periphery of the second rotor having a circumferential row of recesses spaced substantially the same as the seats and shaped to receive the shanks of pins with the pin heads directed radially so as to be presented to said seats at said point, the width of said recesses circumferentially of the rotor approximating the smaller cross-sectional dimension of the shanks so that the shanks can be inserted in the recesses only with their long cross-sectional dimensions extending axially of the rotor, means for detachably holding the pins on said seats, means for feeding the ribbon to the first rotor tangentially so that said shanks enter said openings, and means for pressing the ribbon toward the first rotor to seat the ribbon against said heads.

4. For inserting into a ribbon having a row of openings pins having shanks projecting through the openings with heads seating on one side of the ribbon around the openings, a machine comprising a support, journaled on the support a rotor having on its periphery a circumferential row of seats for supporting said pins with their heads bearing on the seats and their shanks projecting radially, the circumferential spacing of the seats approximating that of the openings in the ribbon, journaled on said support a second rotor for feeding pins to said seats, the two rotors having parallel axes and tangential peripheries and equal peripheral speeds in the same direction at the point of tangency, the periphery of the second rotor having a circumferential row of recesses spaced substantially the same as the seats and shaped to receive the shanks of pins with the pin heads directed radially so as to be presented to said seats at said point, said recesses also opening to one side of the second rotor, a guideway through which a row of pins may be fed to the recesses from said side, means for yieldingly pressing the row against said side so that the foremost pin enters a recess as the recess passes the guideway, means for detachably holding the pins on said seats, means for feeding the ribbon to the first rotor tangentially so that said shanks enter said openings, and means for pressing the ribbon toward the first rotor to seat the ribbon against said heads.

5. For inserting into a ribbon having a row of openings pins having shanks projecting through the openings with heads seating on one side of the ribbon around the openings, a machine comprising a support, journaled on the support a rotor having on its periphery a circumferential row of seats for supporting said pins with their heads bearing on the seats and their shanks projecting radially, the circumferential spacing of the seats approximating that of the openings in the ribbon, journaled on said support a second rotor for feeding pins to said seats, the two rotors having parallel axes and tangential peripheries and equal peripheral speeds in the same direction at the point of tangency, the periphery of the second rotor having a circumferential row of recesses spaced substantially the same as the seats and shaped to receive the shanks of pins with the pin heads directed radially so as to be presented to said seats at said point, said recesses also opening to one side of the second rotor, a guideway through which a row of pins may be fed to the recesses from said side with their shanks projecting in the same direction, means for yieldingly pressing the row against said side so that the foremost pin enters a recess as the recess passes the guideway, said last means including a sprocket wheel meshing with the shanks of said row and a torque motor for driving the sprocket wheel, means for detachably holding the pins on said seats, means for feeding the ribbon to the first rotor tangentially so that said shanks enter said openings, and means for pressing the ribbon toward the first rotor to seat the ribbon against said heads.

6. For inserting into a ribbon having a row of openings pins having shanks projecting through the openings with heads seating on one side of the ribbon around the openings, each of said shanks having an elongate cross-section with the short dimension extending lengthwise of the ribbon and the long dimension extending crosswise of the ribbon, a machine comprising a support, mounted on the support means for inserting the pins into said openings, a guideway through which pins may be fed to said means in a row with their shanks projecting in the same direction, rollers on opposite sides of the path of the shanks, the rollers being spaced apart a distance greater than said short dimension but less than said long dimension so that the pins may pass only when their long dimensions extend lengthwise of the guideway, and means to turn the rollers in the same direction so that the rollers tend to rotate the pins in the same direction by frictional contact with the shanks.

7. For inserting into a ribbon having a row of openings pins having shanks projecting through the openings with heads seating on one side of the ribbon around the openings, each of said shanks having an elongate cross-section with the short dimension extending lengthwise of the ribbon and the long dimension extending crosswise of the ribbon, a machine comprising a support, mounted on the support a pin hopper, means for inserting the pins into said openings, a guideway leading from the hopper to said means, means along the guideway for discarding from the guideway all pins which do not have their shanks projecting in the same direction, farther along the guideway rollers on opposite sides of the path of the shanks, the rollers being spaced apart a distance greater than said short dimension but less than said long dimension so that the pins may pass only with their long dimensions extending lengthwise of the guideway, and means to turn the rollers in the same direction so that the rollers tend to rotate the pins in the same direction by frictional contact with the shanks.

References Cited in the file of this patent

UNITED STATES PATENTS

| | | |
|---|---|---|
| 2,171,193 | Ruau | Aug. 29, 1939 |
| 2,356,291 | Whittaker | Aug. 22, 1944 |
| 2,698,478 | Heisterkamp | Jan. 4, 1955 |